United States Patent
Stjerneby

[19]

[11] Patent Number: 6,023,024
[45] Date of Patent: Feb. 8, 2000

[54] PARTITION DEVICE FOR A CABLEWAY

[75] Inventor: Sven Stjerneby, Anderstorp, Sweden

[73] Assignee: Defem System AB, Anderstorp, Sweden

[21] Appl. No.: 08/966,822

[22] Filed: Nov. 10, 1997

[51] Int. Cl.[7] .................................................. H02G 3/04
[52] U.S. Cl. ........................... 174/95; 174/97; 174/99 R; 248/49; 211/184
[58] Field of Search .............................. 174/95, 97, 99 R, 174/100, 72 R, 88 R, 71 R, 99 E, 72 A, 101, 68.1, 68.3; 248/49, 68.1; 211/181.1, 184, 90.03

[56] References Cited

U.S. PATENT DOCUMENTS

| | | | |
|---|---|---|---|
| 3,325,128 | 6/1967 | Elleboudt | 248/68.1 |
| 3,633,628 | 1/1972 | Duquette | 138/116 |
| 3,948,473 | 4/1976 | Mason | 248/49 |
| 4,395,009 | 7/1983 | Bormke | 248/68.1 |
| 5,169,010 | 12/1992 | Fortner | 211/86.01 |
| 5,531,410 | 7/1996 | Simon | 248/49 |
| 5,663,527 | 9/1997 | Hui | 174/68.3 |

FOREIGN PATENT DOCUMENTS

| | | | |
|---|---|---|---|
| 0661945 | 4/1963 | Canada | 211/181.1 |
| 1449281 | 9/1976 | Canada | 211/184 |
| 205 301 | 11/1965 | Sweden . | |
| WO 96/08063 | 3/1966 | WIPO . | |
| WO 91/00973 | 1/1991 | WIPO . | |

*Primary Examiner*—Kristine Kincaid
*Assistant Examiner*—Dhiru R Patel
*Attorney, Agent, or Firm*—Bake & Daniels

[57] ABSTRACT

A cableway of the kind which is constituted by a number of longitudinally extending thread elements positioned at a distance from each other as well as transversely extending thread elements connecting the longitudinally extending thread elements with each other is provided with a device in the form of partition elements for dividing the cableway into at least two longitudinally extending compartments occupying the whole height of the cableway.

16 Claims, 2 Drawing Sheets

PARTITION DEVICE FOR A CABLEWAY

The present invention relates to a partition device for a cableway of the kind comprising a number of longitudinally extending thread elements positioned at a distance from each other as well as transversely extending thread elements connecting the longitudinally extending thread elements.

The use of computer systems and other systems requiring cable connections to and between a large number of different work places has made it necessary to find rational ways for the laying of cables. For this purpose there has been developed so called cableways, i.e. elongated ladder-like devices consisting of longitudinally and transversely extending elements. The cableways are fastened to wall surfaces, sealing surfaces and/or carrier surfaces by means of different types of attachments and can support a large number of cables which are placed on and are by means of tying or in any other suitable way fixed to the cableways. The cableways can consist of a number of longitudinally extending thread elements positioned at a distance from each other and as well as transversely extending thread elements connecting the longitudinally extending thread elements with each other.

It is in certain cases desirable to separate the cables supported by the cableways from each other in groups. It is for example from PCT/DK/95/00360 for this purpose previously known to position in cableways horizontally extending support or spacing means dividing the cableways into compartments positioned above each other and in a addition thereto separating the cables from each other in a horizontal direction. An obvious drawback in a system of this kind is the difficulties in branching off cables positioned in an upper compartment by diverting cables from the bottom of the cableway and that it is at the removal or replacement of cables positioned in the lower part of the cableway necessary also to remove the cables positioned above the cables which shall be removed or shall be replaced. Of course, this makes the work more complicated and time-consuming.

The object of the invention is to provide a partition device for a cableway for separating the cables supported by the cableway from each other in groups, in which said drawbacks have been obviated.

In order to comply with this object the device according to the invention is characterized by partition elements for dividing the cableway into at least two longitudinally extending compartments occupying the complete height of the cableway.

It is suitable that the partition elements of the device according to the invention comprise longitudinally extending, substantially vertically oriented partition walls which for example can be constituted by strip-shaped partition plates. The plates can be formed with reinforcement grooves and can be provided with folded edge portions so as to provide the plates with sufficient stability.

The device according to the invention comprises retainers for fixing the partition elements to the cableway, and these retainers are preferably provided with fastening means for fixing the retainers to the thread elements of the cableway and with retainer means for fixing the partition elements to the retainers. Thereby, the fastening means can be adapted for fixing the retainers to the transversely extending thread elements of the cableway and the fastening means are suitably eccentrically positioned in relation to the retainer means which by turning of the retainer means makes it possible to position the retainers at all places of the width of the cableway also above the longitudinally extending thread elements of the cableway.

The device according to the invention makes it possible to divide in a simple way a cableway into longitudinally extending compartments without obstructing the removal or replacement of the cables supported by the cableway or preventing that cables are branched off from the cableway by leading out the cables through the bottom of the cableway.

The invention shall be described in the following with reference to the accompanying drawings.

Figure 1:
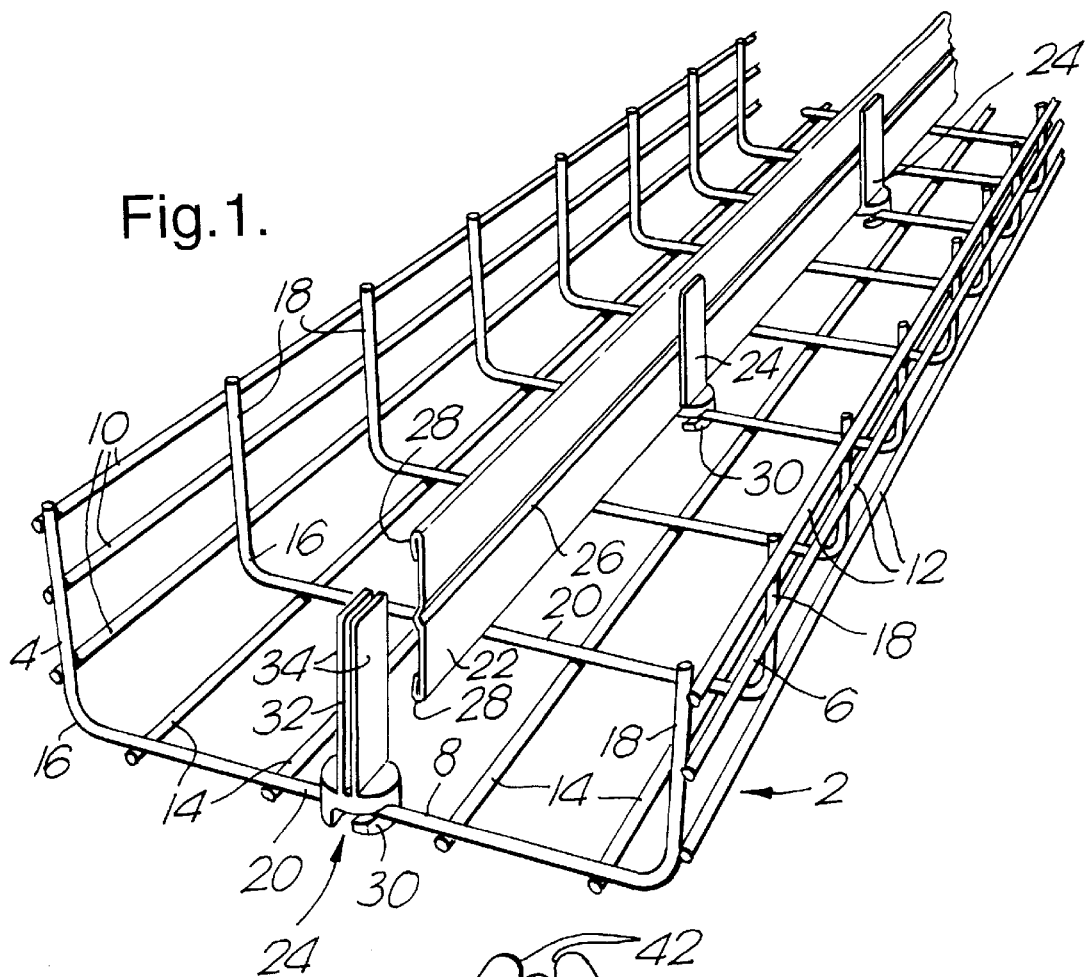
FIG. 1 shows a cableway which by means of a device according to the invention is divided into two longitudinally extending compartments.

The cableway shown in FIG. 1 which includes a device according to the invention has a substantially U-shaped cross-section. The cableway 2 has two side walls 4 and 6 and a bottom 8 which are constituted by longitudinally extending threads 10, 12 and 14, respectively. The longitudinally extending threads 10, 12 and 14 are connected with each other by means of transversely extending, U-shaped threads 16, the shanks 18 of which are connected with the longitudinally extending threads 10 and 12 of the side walls 4 and 6 and the web portion 20 of which is connected with the longitudinally extending threads 14 of the bottom 8.

The cableway shall support a number of cables (not shown) which by means of tying or in any other way are fastened to the cableway.

In order to make it possible to divide the cables supported by the cableway 2 in groups without obstructing the possibilities of replacing, removing or branching off cables from the cableway through the bottom thereof the cableway is provided with a device according to the invention. The device according to the invention comprises a a partition element such as strip-shaped partition plate 22 and retainers 24 for fastening the partition plate 22 to the cableway 2. The partition plate 22 extends in the longitudinal direction of the cableway in a vertical position and divides the cableway into two compartments occupying the complete height of the cableway. It is of course possible to divide the cableway into a desired number of compartments by means of partition plates 22.

The partition plate 22 is formed with a longitudinally extending reinforcement groove 26 and has folded edge portions 28.

The retainers 24 for fixing the partition plate 22 to the cableway are provided with fastening means 30 for fixing the retainers 24 to the transversely extending, U-shaped threads 16 of the cableway and more precisely to the web portions 20 thereof. The retainers 24 consist of plastic material and the fastening means 30 are constituted by recesses formed in the plastic material and positioned around the transversely extending threads of the cableway by means of snap action so that the fastening means are fixed to the transversely extending threads while receiving the threads in the recesses thereof. In addition thereto the retainers 24 are provided with retainer means 32 for fixing the partition plates 22 to the retainers and thereby to the cableway. The retainer means 32 are constituted by two parallel leg-shaped elements 32 connected with one fastening means 30 each and forming between themselves a groove for receiving the partition plate 22. Thus, the groove has a width substantially corresponding to the total thickness of the partition plate, i.e. the partition plate including the reinforcement groove 26 and the folded edge portions 28.

Figure 2:
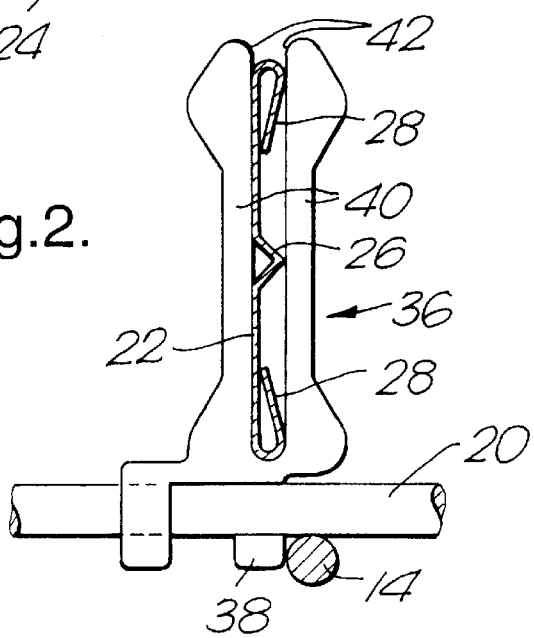
FIG. 2 is an end view of a retainer included in the device according to the invention.
Figure 3:
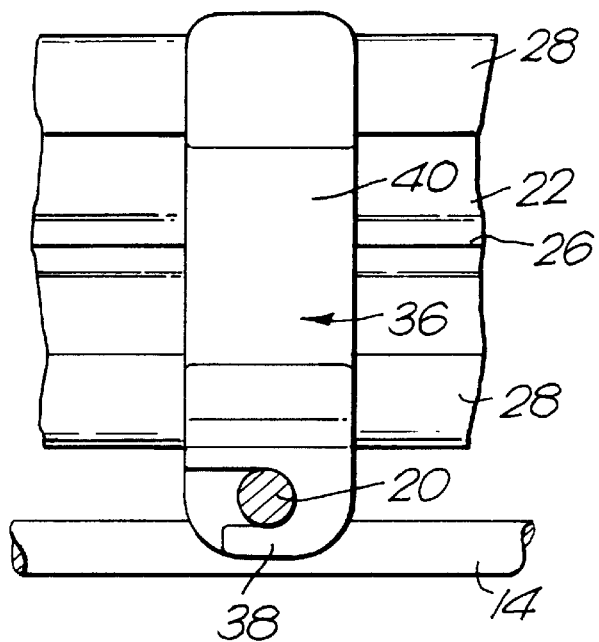
FIG. 3 is a side view of the retainer shown in FIG. 2.
Figure 4:
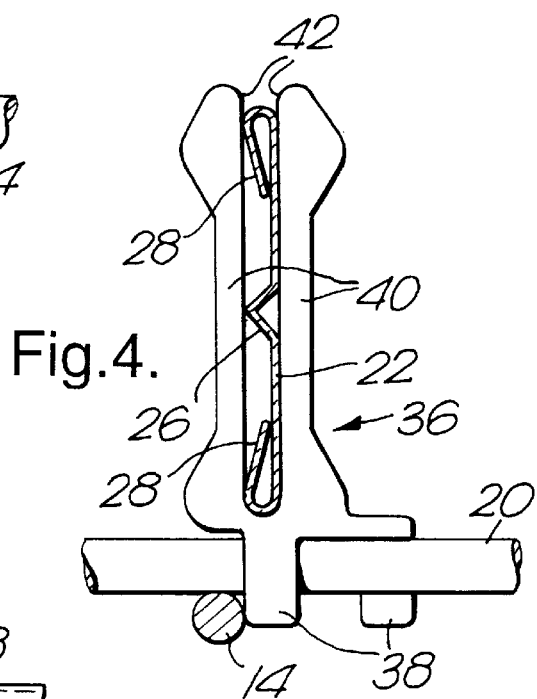
FIG. 4 shows the retainer of FIGS. 2 and 3 in an inverted position in relation to FIG. 2.

In FIGS. 2–4 there is shown a somewhat modified embodiment of a retainer 36 for fixing the partition plate 22 to the cableway. The retainer 36 has a fastening element formed by two U-shaped elements 38 for fixing the retainer 36 to the thread 20 of the cableway, and these two U-shaped elements 38 form recesses opening in opposite directions. Thus, the retainer 36 is fastened to the thread 20 by positioning the retainer 36 with the fastening element formed by the U-shaped elements 38 from above over the thread 20, whereupon the retainer is turned to a position in which the thread 20 is received in the recesses formed by the U-shaped elements 38. A pair of leg-shaped elements 40 forming the retainer elements of the retainer 36 for fastening the partition plate 22 are connected with the U-shaped elements 38. The leg-shaped elements 40 form between themselves a groove for receiving the partition plate 22, and the width of the groove corresponds to the total thickness of the partition plate 22. The leg-shaped elements 40 have at their upper ends inwardly projecting projections 42 which by engagement with the upper folded edge portion 28 of the partition plate 22 fix the plate in the groove of the retainer 36.

The leg-shaped elements 42 are eccentrically positioned in relation to the U-shaped elements 38 which provides that the groove positioned between the leg-shaped elements 40 for receiving the partition plate 22 can be placed in any desired position of the width of the cableway. Thus, as appears from FIGS. 2 and 4 it is possible to turn the retainer 36 so that the groove for receiving the partition plate 22 can be positioned also above the longitudinally extending threads of the cableway.

It is realized that it is by means of bending of the partition plate 22 possible to adapt the plate to all kinds of horizontal radii of the extension of the cableway.

Figure 5:
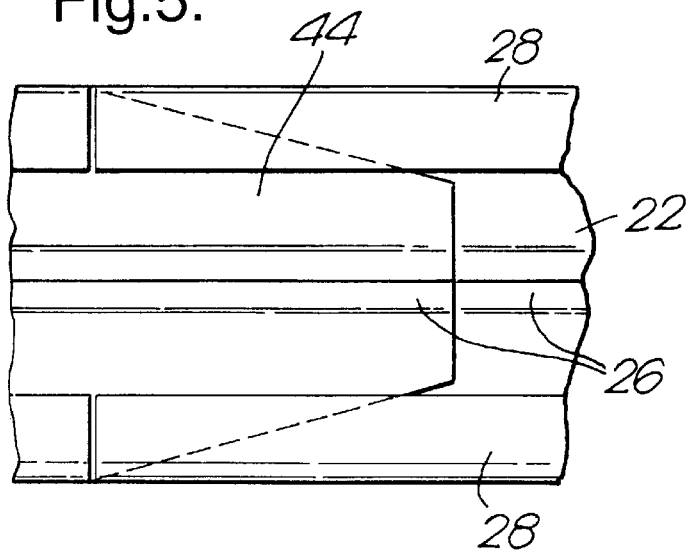
FIG. 5 illustrates the jointing of two partition plates included in the device according to the invention.

The partition plate 22 are manufactured in desired lengths and can be jointed as indicated in FIG. 5. For example the partition plates 22 can at one end have a projecting portion 44 which is pushed together with a connecting portion of an adjacent partition plate so that the projecting portion 44 will at its side edges be positioned inside the folded edge portions 28 of the connecting partition plate 22. The required locking can be provided for example by means of a hole and a corresponding projection or in any other conventional way.

The invention can be modified within the scope of the following claims.

What is claimed is:

1. A partition device in a cableway of a type which is constituted by a number of longitudinally extending thread elements positioned at a distance from each other and transversely extending thread elements connecting the longitudinally extending thread elements, comprising partition elements for separating the cableway into at least two longitudinally extending compartments occupying substantially an entire height of the cableway, and retainers fastening the partition elements to the cableway.

2. A partition device as claimed in claim 1, wherein the partition elements comprise longitudinally extending, substantially vertically oriented partition walls.

3. A partition device as claimed in claim 2, wherein the partition walls are constituted by strip-shaped partition plates.

4. A partition device as claimed in claim 3, wherein the partition walls are formed with reinforcing grooves.

5. A partition device as claimed in claim 3, wherein the partition walls are constituted by said strip-shaped partition plates having folded edge portions.

6. A partition device as claimed in claim 2, wherein the partition walls are formed with reinforcing grooves.

7. A partition device as claimed in claim 6, wherein the partition walls are constituted by partition plates having folded edge portions.

8. A partition device as claimed in claim 2, wherein the partition walls are constituted by partition plates having folded edge portions.

9. A partition device as claimed in claim 1, wherein the retainers are provided with fastening elements for fixing the retainers to one of the longitudinally extending and the transverely extending thread elements of the cableway and with retainer elements for fixing the partition elements to the retainers.

10. A partition device as claimed in claim 9, wherein the fastening elements are adapted to fix the retainers to the transversely extending thread elements of the cableway.

11. A partition device as claimed in claim 10, wherein the fastening elements are eccentrically positioned in relation to said retainer elements and wherein the retainer elements can by turning the retainers be positioned in all places laterally within the cableway also above the longitudinally extending thread elements of the cableway.

12. A partition device as claimed in claim 11, wherein the fastening elements consist of plastic material and are adapted to be forced over the transversely extending thread elements of the cableway to a position in which the transversely extending thread elements of the cableway are received in recesses in the respective retainers.

13. A partition device as claimed in claim 8, wherein the fastening elements consist of plastic material and are adapted to be forced over the transversely extending thread elements of the cableway to a position in which the transversely extending thread elements of the cableway are received in recesses in the respective retainers.

14. A partition device as claimed in claim 7, wherein the fastening elements consist of plastic material and are adapted to be forced over said one of the longitudinally extending and the transversely extending thread elements of the cableway to a position in which said one of the longitudinally extending and the transversely extending thread elements of the cableway are received in recesses in the respective retainers.

15. A partition device as claimed in claim 14, wherein the retainer elements form grooves for receiving the partition elements.

16. A partition device as claimed in claim 9, wherein the retainer elements form grooves for receiving the partition elements.

* * * * *